(12) United States Patent
Rowe (10) Patent No.: US 6,377,906 B1
(45) Date of Patent: Apr. 23, 2002

(54) ATTITUDE ESTIMATION IN TILTABLE BODY USING MODIFIED QUATERNION DATA REPRESENTATION

(75) Inventor: Jeffrey D. Rowe, Huntsville, AL (US)

(73) Assignee: Independence Technology, L.L.C., Warren, NJ (US)

( * ) Notice: Subject to any disclaimer, the term of this patent is extended or adjusted under 35 U.S.C. 154(b) by 0 days.

(21) Appl. No.: 09/496,785

(22) Filed: Feb. 3, 2000

(51) Int. Cl.[7] .............................................. G01C 19/00
(52) U.S. Cl. ...................... 702/151; 702/150; 702/152; 702/153; 33/321; 701/4; 701/124; 244/164; 244/171
(58) Field of Search ................................. 702/150, 151, 702/152, 153, 109; 340/973, 974, 975, 967, 970; 701/4, 5, 38, 124; 33/320, 321, 401; 700/71; 244/3.21, 164, 165, 171

(56) References Cited

U.S. PATENT DOCUMENTS

| | | | |
|---|---|---|---|
| 4,737,794 A | | 4/1988 | Jones |
| 4,742,356 A | | 5/1988 | Kuipers |
| 4,797,836 A | | 1/1989 | Witek et al. |
| 5,212,480 A | | 5/1993 | Ferro |
| 5,465,077 A | * | 11/1995 | Kinoshita et al. ........... 335/132 |
| 5,701,965 A | | 12/1997 | Kamen et al. |
| 5,875,993 A | | 3/1999 | Weiss et al. |

OTHER PUBLICATIONS

"Extended Quest Attitude Determination Filtering", Mark L. Psiaki (Cornell University), Presented at the Flight Mechanics Symposium, NASA Goddard Space Flight Centrer, Greenbelt, MD–May 18, 1999.

"Maths In Computer Graphics–Quaternions"—from website:www.scs.leeds.ac.uk/mart/quarternions.html—Oct. 11, 1999.

"Notes On Quatrenions And Vectors", Kim R. Bailley, Erie Systems, Inc., Troy MI—Oct. 19, 1999.

"On Quaternions", Sir William Rowan Hamilton [Proceedings of the Royal Irish Academy, Nov. 11, 1844 vol. 3(1847), 1–16]—from website www.maths.tcd/ie/pub/hismath/people/hamilton/quaterns2/quatern2html.

* cited by examiner

Primary Examiner—Marc S. Hoff
Assistant Examiner—Hien Vo (57) ABSTRACT

The attitude of a tiltable body is tracked and controlled on the basis of signals outputted from gyros and tilt sensors. The signals outputted from the gyros are transformed and integrated to produce estimated position information in the form of a modified quaternion in which the yaw component is constrained to a zero value. Modified quaternion information in the same form is also generated from signals outputted from the tilt sensor and is used to detect and correct an error component in the estimated position information. Gyro drift is also corrected based on the output of the tilt sensor.

11 Claims, 2 Drawing Sheets

ATTITUDE/ROTATION ESTIMATION

FIG. 3 CONTROL SYSTEM

FIG. 4 ATTITUDE/ROTATION ESTIMATION

ATTITUDE ESTIMATION IN TILTABLE BODY USING MODIFIED QUATERNION DATA REPRESENTATION

This invention relates to tracking and control of tiltable bodies.

It is known to use quaternions to represent the orientation in space of an object. Quaternion notation is, in general, more computationally efficient to use than the more widely employed Euler data representation. Furthermore, quaternion notation is not subject to singularities which can occur when using Euler notation. The following U.S. patents disclose using quaternions to control, determine and/or display the orientation of an object in space: Nos. 5,875,993; 5,212,480; 4,797,836; 4,742,356; and 4,737,794.

GENERAL DISCUSSION OF QUATERNIONS

A quaternion is a four-element, hypercomplex number first conceived by Sir William Rowan Hamilton in 1843. A quaternion consists of a scalar part and a complex vector part. The vector part consists of an ordered triple (vector) of three real components which are assigned direction by three orthogonal complex unit vectors: i, j, k. An example of a general quaternion Q is shown below:

$$Q = q_0 + iq_1 + jq_2 + kq_3 \tag{Eq. 1}$$

Addition of quaternions is performed by adding components in like directions. Multiplication is performed by noting the following products of the unit basis vectors:

$$i^2 = j^2 = k^2 = ijk = -1 \tag{Eq. 2}$$

$$ij = -ji = k \tag{Eq. 3}$$

$$jk = -kj = i \tag{Eq. 4}$$

$$ki = -ik = j \tag{Eq. 5}$$

Since the quaternion is hypercomplex, it also has a complex conjugate in which the direction of the vector part is reversed. An example is shown below:

$$Q^* = q_0 - iq_1 - jq_2 - kq_3 \tag{Eq. 6}$$

The square magnitude of the quaternion can be computed by forming the product of the quaternion with its complex conjugate as shown:

$$Q^2 = QQ^* = q_0^2 + q_1^2 + q_2^2 + q_3^2 \tag{Eq. 7}$$

A quaternion with unit magnitude ($Q^2 = 1$) has special significance. Specifically, it acts as a two-sided rotation operator. It is worthy of note that Hamilton discovered quaternions through his efforts to develop a three dimensional extension of the rotational effect produced in the complex plane when a complex number is multiplied by a unit complex number of the form exp ($i\theta$). The rotational effect of exp ($i\theta$) results because multiplication of complex numbers requires the multiplication of their respective magnitudes and the addition of their respective phases. Since exp ($i\theta$) has unit magnitude, it can only affect the phase of the product. In the complex plane, this manifests itself as a rotation about the origin by an angle $\theta$. In trying to generalize this effect to vector rotations, Hamilton originally tried three-element hypercomplex numbers. It was not until he realized that four elements are required to account for "phase" changes in three-dimensional space that he successfully produced the desired result.

Typically, a vector rotation is accomplished using a one-sided rotation operator, R, which in three-dimensional space can be represented as a real, 3×3 orthogonal matrix. This transformation matrix rotates a vector, x, into a vector, x', by multiplication on the left as shown:

$$x' = Rx \text{ where } x \in R^{3 \times 1} \text{ and } R \in R^{3 \times 3} \tag{Eq. 8}$$

A two-sided operator must be applied using both left and right multiplication. In the case of the quaternion operator, the rotation is accomplished when a given quaternion (X) with a null scalar part (i.e. a vector) is pre- and post-multiplied by the unit quaternion and its conjugate as shown:

$$X' = QXQ^* \tag{Eq. 9}$$

The resulting vector, X', is rotated about a general axis by a specific angle, both of which are determined by the unit quaternion, Q. If the axis of rotation is denoted by a unit vector, n, and the angle of rotation is denoted by an angle, $\theta$, then the unit quaternion components can be written as:

$$q_0 = \cos(\theta/2) \text{ and } q = n\sin(\theta/2) \text{ where } q = (q_1, q_2, q_3) \tag{Eq. 10}$$

These components satisfy the normalization condition:

$$1 = q_0^2 + q_1^2 + q_2^2 + q_3^2 \tag{Eq. 11}$$

The quaternion components thus defined are also called the Euler Parameters. These parameters contain all of the information necessary to derive the axis and angle of rotation. The rotation axis defined by unit vector, n, is also called the eigenaxis since it is the eigenvector of the one-sided rotation matrix, R, corresponding to the eigenvalue, $\lambda = +1$. This occurs because the axis of rotation must be common to both the original and rotated frames and therefore must be unchanged by the rotation operator. Note that the so-called eigenaxis rotation is a single rotation about a general axis as compared to the Euler angle rotation which accomplishes the same transformation by performing three separate rotations: yaw, pitch, and roll, about the z, y, and x axes, respectively.

The quaternion complex unit vectors (i, j, k) are related to the Pauli spin matrices as shown:

$$i = -i\sigma_1 \tag{Eq. 12}$$

$$j = -i\sigma_2 \tag{Eq. 13}$$

$$k = -i\sigma_3 \tag{Eq. 13A}$$

where $$i = \sqrt{-1} \tag{Eq. 14}$$

$$\sigma_0 = \begin{bmatrix} 1 & 0 \\ 0 & 1 \end{bmatrix} \tag{Eq. 15}$$

$$\sigma_1 = \begin{bmatrix} 0 & 1 \\ 1 & 0 \end{bmatrix} \tag{Eq. 16}$$

$$\sigma_2 = \begin{bmatrix} 0 & -i \\ i & 0 \end{bmatrix} \tag{Eq. 17}$$

$$\sigma_3 = \begin{bmatrix} 1 & 0 \\ 0 & -1 \end{bmatrix} \tag{Eq. 18}$$

(See *The Theory of Spinors* by E. Cartan.)

Using the definitions of the Pauli spin matrices and the unit quaternion coefficients, the unit quaternion can be written as:

$$Q = \sigma_0 \cos(\theta/2) - i(n \cdot \sigma)\sin(\theta/2) \quad \text{(Eq. 19)}$$

where $$n \cdot \sigma = n_1 \sigma_1 + n_2 \sigma_2 + n_3 \sigma_3 \quad \text{(Eq. 20)}$$

This can also be shown to be equivalent to the following matrix exponential:

$$Q = e^{-i\sigma \cdot \theta/2} \text{ where } \theta = n\theta \quad \text{(Eq. 21)}$$

Note the similarity between this form of the quaternion and the exponential form of a unit complex number discussed previously. This form suggests the three-dimensional change in "phase" that Hamilton was originally seeking. The appearance of the half angle is accounted for by the fact that Q is a two-sided transformation. Thus the left and right factors, Q and Q*, each contribute half of the desired spatial phase shift.

It is often more convenient to use the Pauli spin matrix form rather than the traditional Hamiltonian form of the quaternion. For example, a vector can be represented as a matrix by forming the inner product as shown:

$$X = x \cdot \sigma = x_1 \sigma_1 + x_2 \sigma_2 + x_3 \sigma_3 \quad \text{(Eq. 22)}$$

which yields:

$$X = \begin{bmatrix} x_3 & x_1 - ix_2 \\ x_1 + ix_2 & -x_3 \end{bmatrix} \quad \text{(Eq. 23)}$$

This matrix form has many useful properties. For example, it can be shown that the reflection of the vector, x, through a plane defined by the unit normal, a, is easily produced using the matrix form of the vectors as shown:

$$X' = -AXA \text{ where } A = a \cdot \sigma \quad \text{(Eq. 24)}$$

It can also be shown that any rotation can be produced by two reflections. If the planes of reflection intersect at an angle of $\theta/2$ and the line of intersection is defined by the unit vector, n, then the resulting transformation will rotate any vector, x, about the eigenaxis, n, by an angle, $\theta$. This is illustrated below where the unit normals to the planes are vectors a and b.

$$X' = BAXAB \quad \text{(Eq. 25)}$$

This two-sided operator, which performs a rotation, closely resembles the quaternion rotation described previously. In fact, it can be shown that Q=BA. The following multiplicative identity results from the properties of the matrix form of a vector:

$$AB = \sigma_0 a \cdot b + i(a \times b) \cdot \sigma \quad \text{(Eq. 26)}$$

In the case of a rotation by angle $\theta$, the unit normal vectors, a and b, must intersect at angle $\theta/2$. Therefore, their dot and cross products produce $a \cdot b = \cos(\theta/2)$ and $a \times b = n \sin(\theta/2)$ where n is parallel to the line of intersection. Substitution of these values into Eq. 26 produces the desired result:

$$Q = BA = \sigma_0 \cos(\theta/2) - i(n \cdot \sigma)\sin(\theta/2) = e^{-i\sigma \cdot \theta/2} \quad \text{(Eq. 27)}$$

An interesting feature of this development is that the coefficients of the quaternion can be found using simple dot and cross products of the appropriate unit vectors. In particular, the two vectors, a and b, must be perpendicular to the axis of rotation and separated by an angle of $\theta/2$. It can also be shown that given knowledge of two arbitrary vectors $\alpha$ and $\beta$ in one frame of reference and knowledge of their rotated counterparts $\alpha'$ and $\beta'$ in the rotated frame of reference, then the quaternion and the associated rotation matrix responsible for the transformation can be uniquely determined. Thus, given two vectors defined in the base frame between the origin and two external reference points, the attitude of the system can be uniquely determined by taking additional "sightings" of the same two external reference points from the rotated frame and comparing the coordinates of the reference vectors measured in the final frame to those measured in the initial frame.

It may also be contemplated to compute quaternion components by direct integration of a quaternion rate. This requires an expression for the derivative of the quaternion as a function of angular rate. This can be derived by differentiating Eq. 21. The resulting derivatives of the quaternion coefficients are each a linear combination of the angular rate components weighted by the existing quaternion components. If the quaternion and angular rates are placed in vector form, the following matrix equation results:

$$\begin{bmatrix} \dot{q}_0 \\ \dot{q}_1 \\ \dot{q}_2 \\ \dot{q}_3 \end{bmatrix} = \frac{1}{2} \begin{bmatrix} -q_1 & -q_2 & -q_3 \\ q_0 & -q_3 & q_2 \\ q_3 & q_0 & -q_1 \\ -q_2 & q_1 & q_0 \end{bmatrix} \begin{bmatrix} \omega_1 \\ \omega_2 \\ \omega_3 \end{bmatrix} \quad \text{(Eq. 28)}$$

where the dotted $q_i$ are the components of the quaternion rate and the $\omega_i$ are the components of the angular rate $\omega$ (=$\dot{\theta}$).

The orientation and/or rotation of a body may be represented in more than one frame of reference. For example it is possible to define a frame of reference relative to the body of interest itself, or to define a frame of reference relative to an external fixed object. For some applications the earth may be taken as a fixed object for defining a frame of reference. In Eq. 28 the angular rate is referenced to the body frame. A similar matrix equation in which the angular rate is referenced to the earth frame is shown below as Eq. 29. Note that shifting the reference frame produces several sign changes in the quaternion matrix.

$$\begin{bmatrix} \dot{q}_0 \\ \dot{q}_1 \\ \dot{q}_2 \\ \dot{q}_3 \end{bmatrix} = \frac{1}{2} \begin{bmatrix} -q_1 & -q_2 & -q_3 \\ q_0 & q_3 & -q_2 \\ -q_3 & q_0 & q_1 \\ q_2 & -q_1 & q_0 \end{bmatrix} \begin{bmatrix} \omega_{E1} \\ \omega_{E2} \\ \omega_{E3} \end{bmatrix} \quad \text{(Eq. 29)}$$

Eq. 29 can be written in a more compact form using matrix variables as shown:

$$dq/dt = Q\omega_E/2 \quad \text{(Eq. 30)}$$

Eq. 30 can also be solved for $\omega_E$ as shown below by noting that $Q^T Q = I$:

$$\omega_E = 2Q^T(dq/dt) \quad \text{(Eq. 31)}$$

When the quaternion rate equation is integrated using the instantaneous angular rate of the body in question, the resulting quaternion contains the information necessary to transform coordinates from the initial frame of reference to the rotated frame. Thus, the quaternion components can be used to form the rotation matrix, R, described previously (Eq. 8). The rotation matrix which transforms body coordinates into earth coordinates is shown below in terms of quaternion components:

$$R_{EB} = \begin{bmatrix} q_0^2 + q_1^2 - q_2^2 - q_3^2 & 2(q_1q_2 - q_3q_0) & 2(q_1q_3 + q_2q_0) \\ 2(q_2q_1 + q_3q_0) & q_0^2 - q_1^2 + q_2^2 - q_3^2 & 2(q_2q_3 - q_1q_0) \\ 2(q_3q_1 - q_2q_0) & 2(q_3q_2 + q_1q_0) & q_0^2 - q_1^2 - q_2^2 + q_3^2 \end{bmatrix} \quad \text{(Eq. 32)}$$

Since the transformation matrix, $R_{EB}$, is orthogonal, its transpose is the inverse transformation, $R_{BE}$. Therefore, quaternions can be used to track the attitude of a body through any angular motion.

For the purpose of comparison, the equations for computing the Euler angle rates are shown below. The associated rotation matrix, R, is also shown as a function of the Euler angles.

$d\phi/dt = P + (d\psi/dt)\sin\theta$ $d\theta/dt = Q\cos\phi - R\sin\phi$ $d\psi/dt = (Q\sin\phi + R\cos\phi)\sec\theta$ where $\varphi$ = Roll
$\theta$ = Pitch
$\psi$ = Yaw
$\omega$ = Angular Rate Vector = $[P \quad Q \quad R]^T$ $$R_{EB} = \begin{bmatrix} \cos\psi\cos\theta & \cos\psi\sin\theta\sin\phi - \sin\psi\cos\phi & \cos\psi\sin\theta\cos\phi + \sin\psi\sin\phi \\ \sin\psi\cos\theta & \sin\psi\sin\theta\sin\phi + \cos\psi\cos\phi & \sin\psi\sin\theta\cos\phi - \cos\psi\sin\phi \\ -\sin\theta & \cos\theta\sin\phi & \cos\theta\cos\phi \end{bmatrix}$$

As is known, the Euler method depends heavily on trigonometric functions and is quite computationally intensive. In addition, the Euler rate equations depend on the secant of the pitch angle which results in a singularity when the pitch reaches ±90 degrees. In contrast, the quaternion method contains no trigonometric functions and relies only on multiplication and addition. Consequently, the quaternion method is far more computationally efficient. As was noted above, the attitude of a body can be uniquely represented in quaternion form, given two vectors defined in the body frame and two external reference points. However, it can be difficult and/or expensive to establish two external reference points, particularly in the case of terrestrial objects, whether located on land or on or under the surface of a body of water.

The present inventor believes he is the first to recognize how quaternion notation may be usefully modified such that only one external reference point is needed to generate the modified quaternion form, and that such a modified quaternion form may be usefully applied to bodies which are free to tilt, but for which the heading (yaw) is constrained or need not be controlled by the system which employs the modified quaternions.

OBJECTS AND SUMMARY OF THE INVENTION

It is an object of the invention to provide improved tracking and/or control of tiltable objects.

It is a further object of the invention to provide a tracking and control system which is less computationally demanding than prior art systems.

It is still a further object of the invention to provide quaternion processing to a system in which only one external reference is available.

It is yet another object of the invention to provide reliable high-bandwidth tracking of an object's orientation.

An aspect of the invention provides a method of estimating the attitude of a tiltable body, where the body includes tilt sensing devices such as a fluidic tilt sensors and angular rate sensing devices such as gyros. The method includes the steps of: outputting angular rate information from the angular rate sensing devices, transforming and integrating the outputted angular rate information to produce first quaternion position information such that the first quaternion position information is constrained to represent a rotation about a horizontal axis in an earth frame of reference, outputting tilt information from the tilt sensing devices, processing the outputted tilt information to generate second quaternion position information such that the second quaternion position information is constrained to represent a rotation about a horizontal axis in the earth frame of reference, comparing the first quaternion position information to generate error information, and using the error information to compensate for drift in the angular rate sensing devices.

Another aspect of the invention provides a method of estimating the attitude of a tiltable body, where the body includes tilt sensing devices such as fluidic tilt sensors and angular rate sensing devices such as gyros. The method includes the steps of: outputting angular rate information from the angular rate sensing devices, generating modified quaternion rate information from the outputted rate information, with the modified quaternion rate information being in the form of a scalar quantity and a two-component vector, integrating the modified quaternion rate information to generate first modified quaternion attitude information, with the step of generating the modified quaternion rate information being constrained so that the first modified quaternion attitude information is of the form $e = e_0 + e_1 i + e_2 j$, where i, j are imaginary unit vectors which satisfy the following relations with each other and with a third imaginary unit vector k:

$i^2 = j^2 = k^2 = ijk = -1, \; ij = -ji = k, \; jk = -kj = i, \; ki = -ik = j;$ outputting tilt information from the tilt sensing devices, generating second modified quaternion position information from the outputted tilt information, with the second quaternion position information being of the form $e = e_0 + e_1 i + e_2 j$, comparing the first modified quaternion position information to the second modified quaternion position information to generate modified quaternion position error information, transforming the modified quaternion position error information into an angular rate error signal, and using the angular rate error signal to compensate for an error in the outputted angular rate information.

With the method provided in accordance with the invention, tilt information outputted from a fluidic sensor or the like is used to compensate for drift or other offsets in a high-bandwidth angular rate sensor, such as a set of gyros. The error compensation provided through the tilt reference data allows the corrected high-bandwidth angular rate data to be integrated to provide a real-time attitude tracking estimate that does not accumulate offset errors. Heading angular rate information (yaw rate information) is discarded to produce a modified (3-component) quaternion representation that is compared with a similar modified quaternion rate information derived from tilt information and based on a single, gravitational reference point. Error compensation and filtering are performed with quaternion notation to provide computational efficiency.

The above, and other aspects, features and advantages of the invention will be set forth in and/or apparent from the following description and drawings.

DETAILED DESCRIPTION OF PREFERRED EMBODIMENTS

Figure 1:
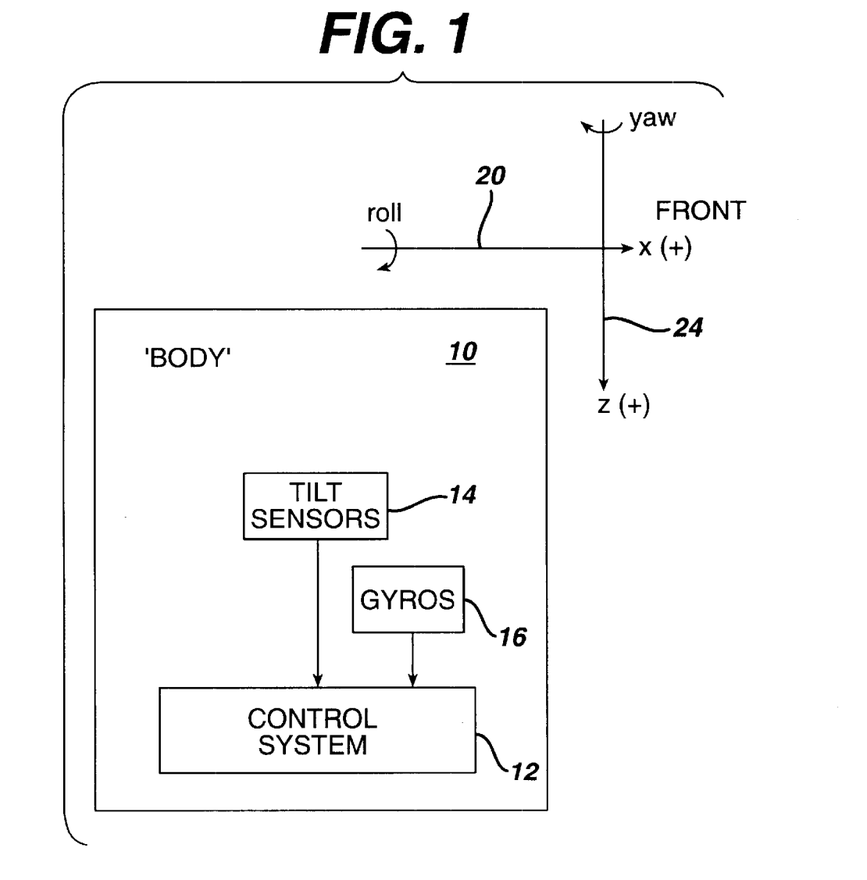
FIG. 1 is a schematic and generalized side view of a tiltable body with respect to which the present invention is applied.

FIG. 1 is a schematic side view of a generalized tiltable body 10 to which the present invention is applicable.

Figure 2:
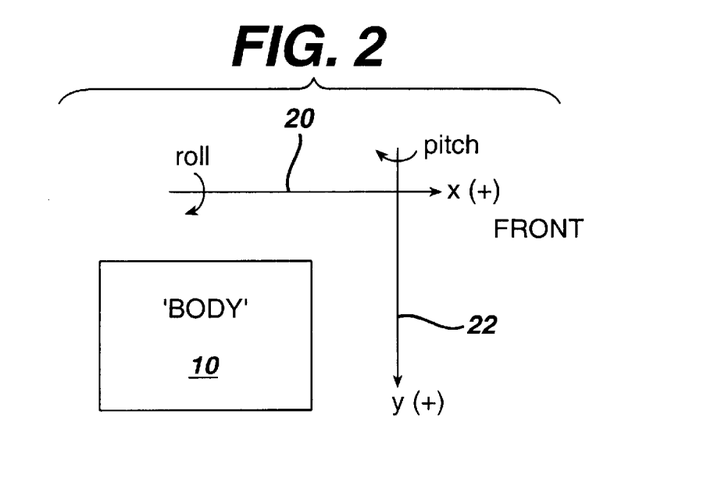
FIG. 2 is a top plan view of the tiltable body of FIG. 1.

FIG. 2 is a top plan view of the same body 10. The body 10 may be any object for which inclination from a level condition is to be tracked, represented and/or controlled. For example, the body 10 may be a robot, a tiltable motor-controlled wheelchair, an off-shore drilling platform, a surface ship or boat or submarine water craft, a tiltable railway locomotive or car, a passenger-bearing enclosure or vehicle in an amusement ride, a flight simulator, or a vessel used to contain and selectively pour out a material used in a chemical reaction or other manufacturing process. Body 10 may also be an automobile. Associated with the body 10 is a control system 12 which receives input from one or more tilt sensing devices 14 and one or more angular rate sensing devices 16. The tilt sensing devices 14 may be conventional fluidic tilt sensors and/or accelerometers. It is contemplated that there be one or more tilt sensors. The angular rate sensor 16 may be constituted by conventional gyros or other known angular rate sensing devices. It is contemplated that there be one or more angular rate sensors.

A coordinate system for the ensuing discussion may be established as illustrated in FIGS. 1 and 2. The horizontal forward direction is considered to be the positive x axis as indicated by arrow 20. The positive y axis is considered to be in the horizontal direction pointing to the right and perpendicular to the x axis, as indicated by arrow 22 (FIG. 2). The positive z axis is considered to be pointing vertically straight down, as indicated by arrow 24 (FIG. 1). Tilt will be defined as an angular deviation from vertical, having a range limited to plus or minus 180°. The direction of tilt is defined in terms of the x and y axes. Rotation around the x axis will be considered to be roll, with a positive roll being tilting to the right. Pitch is defined as rotation around the y axis with positive pitch being a backward tilt. Yaw is defined as rotation around the z (vertical) axis, with positive yaw being defined as rotation to the right. It will be noted that these definitions adhere to a right-hand rule. The above definitions of pitch and roll are similar to those for Euler pitch and roll, except that Euler angles are applied in a specific order and produce intermediate frames of reference. In the tilt-based system discussed herein, it is assumed that rotations around the vertical axis are nonexistent or can be disregarded. For example, the heading of the body 10 may be fixed, or irrelevant to tilt tracking and control, or subject to control by a human operator, or controlled by a system that does not or need not take heading information into account.

Figure 3:
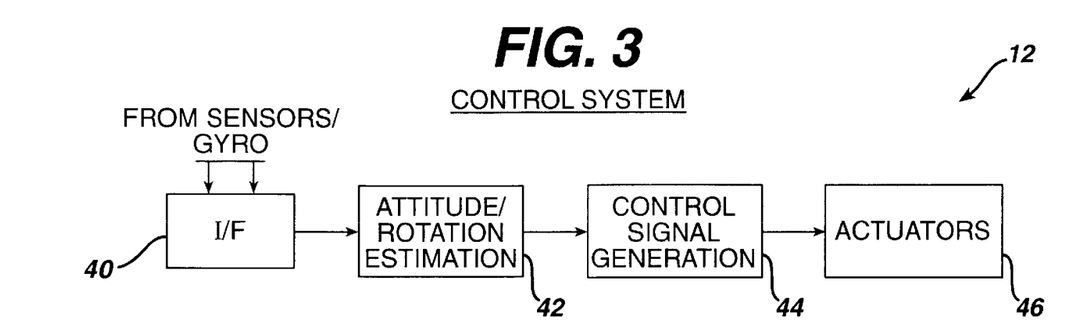
FIG. 3 is a block diagram illustration of a control system for the tiltable body of FIG. 1.

FIG. 3 illustrates, in block diagram form, components of the control system 12 shown in FIG. 1. The control system 12 includes an interface 40 through which the control system 12 receives signals outputted from the tilt sensors 14 and gyros 16. These signals are processed by an attitude/rotation estimation block 42, in accordance with the invention. On the basis of the signals outputted from the gyros and the sensors, block 42 provides an estimate of the attitude and/or angular rotation rates of the body 10, in a manner which will be described below. On the basis of the attitude and/or rotation information provided by block 42, a block 44 generates control signals for controlling actuators 46 to control the attitude of the body 10. The actuators may include motors, solenoids, floodable chambers, or other conventional mechanical, electromechanical, hydraulic or pneumatic devices used to control the attitude of the types of bodies referred to above. Electronic hardware for carrying out at least part of blocks 42 and 44 may be constituted by one or more conventional microprocessors. In addition, the control signal generation block 44 also preferably includes driving circuitry for providing suitable driving signals for the actuators 46.

Although the control system 12 is indicated in FIG. 1 as being carried on the body 10, it should be understood that at least some portions of the control system 10 may be physically separate from the body 10. For example, processing circuitry to carry out some or all of the blocks 42 and 44 may be remote from the body 10 and may receive output from the tilt sensors 14 and gyros 16 via telemetry, and may also transmit control signals back to the body 10, by suitable wireless communication channels.

Attitude and Rotation Estimation

Operation of the attitude/rotation estimation block 42 will now be described.

Tilt sensors, such as conventional fluidic sensors, may be relatively free of drift and therefore provide a reliable indication of a gravity vector. Thus the attitude of a static system can be determined relative to gravity using such sensors. However, in a dynamic system sensors of this type are sensitive to angular and vibrational accelerations, and therefore must be low-pass filtered to attenuate the effects of accelerations other than gravity. The resulting data provides the average direction of gravity over a finite period of time determined by the bandwidth of the filter. However, in systems requiring a fast response time, gravitation sensors alone are not adequate.

On the other hand, gyros or other angular rate sensors may provide high bandwidth and rapid response, without being adversely affected by acceleration. Although the angular rate detected by such sensors does not directly indicate the attitude of the system, the rate data can be integrated to produce position information. However, rate sensors are subject to drift which can cause significant errors when integrated. The estimation process provided by block 42 combines the high and low bandwidth information respectively provided by the gyros 16 and the tilt sensors 14 to provide accurate position and rotation data, using a model-based estimator topology.

In a model-based estimator, an estimate of the true position is produced by comparing sensor data with an internal model of the system dynamics. The error between the measured data and the predicted data is used to continuously refine the estimate. The degree to which this error affects the estimate is determined by a weighting matrix, H, that feeds the appropriate state errors back to the estimator. The state variable equations for such an estimator are shown below:

$dx_e/dt = Ax_e + Bu + H(y - y_e)$ $Y_e = Cx_e + Du$ $dx/dt = Ax + Bu$ $y = Cx + Du$ where
x=System State Vector
$X_e$=Estimated State Vector
y=System Output Vector $Y_e$=Estimated Output Vector
u=System/Estimator Input Vector
A=System Matrix
B=Input Matrix
C=Output Matrix
D=Input/Output Matrix
H=Feedback Matrix Note that the subscript "e" denotes estimated parameters. The internal system model is defined by matrices (A,B,C,D). The feedback matrix H determines the stability of the estimator. A stable estimator will, over time, reach an equilibrium where the actual and estimated states are equal ($x_e$=x). The internal model is often based on simple integrators. The effectiveness of such a simple model is related to the fact that integration and differentiation are fundamental to physical phenomena. For example, rate is the derivative of position: v=dx/dt. Therefore, given a simple, first-order integrator with parameters A=0, B=1, C=1, D=0, and a feedback gain H=$k_1$, it is possible to produce an estimator which combines the measured static position of the system, $\theta_0$, and the measured dynamic position, $\theta$, such that the estimate, $\theta e$, is accurate over the full frequency range. In effect, the estimate is a frequency-dependent weighted sum of the two measurements. The Laplace transform of this result is shown below:

$$\theta e(s)=\theta_0(s)[k_1/(s+k_1)]+\theta(s)[s/(s+k_1)] \quad \text{(Eq. 33)}$$

Note that at low frequency (s=0), the estimated position approaches the low bandwidth position measurement, $\theta_0$, and at high frequency, the estimate position approaches the high bandwidth position measurement, $\theta$. Thus, the high and low bandwidth data are combined.

A more useful estimate can be obtained if the estimator is based on a simple, second order integrator. In this case, a feedback matrix of the form H=$[k_1 \ k_2]^T$ can be used to feedback the low bandwidth measurement, $\theta_0$, via the output matrix C=[10]. The Laplace transform of the resulting position and rate estimates are shown below:

$$\theta e(s)=\omega(s)[s/(s^2+k_1s+k_2)]+\theta_0(s)[(k_1s+k_2)/(s^2+k_1s+k_2)] \quad \text{(Eq. 34)}$$

$$\omega e(s)=\omega(s)[(s^2+k_1s)/(s^2+k_1s+k_2)]+\theta_0(s)[k_2s/(s^2+k_1s+k_2)] \quad \text{(Eq. 35)}$$

where $\omega(s)$ is the measured value of $d\theta/dt$ in the s-domain. Therefore, this estimator topology combines the low bandwidth position, $\theta_0$, with the high bandwidth rate, $\omega$. At low frequency, the estimated position approaches the low bandwidth measurement, $\theta_0$, as before. At high frequency, the estimated position approaches the integral of the high bandwidth rate measurement, $\omega$, which is equivalent to the high bandwidth position, $\theta$. A similar result is obtained for the estimated rate. Thus, this type of estimator is well suited for producing an estimate of angular position and rate from low bandwidth tilt data and high bandwidth angular rate data. The gains $k_1$ and $k_2$ are chosen such that the appropriate filter bandwidth and stability are obtained. Note that letting $k_2$=0 and $\omega(s)=s\theta(s)$ in Eq. 34 produces the same first-order position estimate shown in Eq. 33.

It is known that quaternions can be used to track the attitude of a system through any angular motion. Moreover, quaternions are a computationally efficient notation and also are immune to the singularities encountered by Euler angles. It is also known that data from high and low bandwidth sensors can be combined using an estimator to provide accurate data over the full bandwidth. However, quaternions do not lend themselves to direct physical measurement, and this complicates the derivation of an absolute quaternion reference from tilt sensor data. Without such a reference, it is impossible for the estimator to prevent gyro drift from corrupting the integrated quaternion and eventually causing the system to lose track of its angular position.

From previous discussion it will be recalled that conventional quaternions require two rotated vectors and two external references to uniquely represent a rotation. However, with tilt sensors alone only a single reference, to the center of the earth, is available. The present invention solves this problem for tilt-based systems by providing a modified quaternion notation in which only three elements of the four conventional elements are non-zero, and only a single reference is needed to uniquely represent attitude (tilt) in quaternion form. This solution assumes that the system does not require knowledge of its heading and therefore does not need to track changes in yaw (rotation about the vertical axis).

Based on the previous development, computing the quaternion coefficients from a single reference point requires that the reference vector in each frame be perpendicular to the axis of rotation. For a tilt-based system with gravity as its reference, this is equivalent to requiring that the axis of rotation remain horizontal at all times. If the axis of rotation, n, is always horizontal, then the z-component of the axis must be identically zero. Referring to the definition of the unit quaternion components, this implies that the $q_3$ component of the quaternion must also be identically zero. Therefore, the condition $q_3$=0 becomes a constraint. The resulting quaternion has thus been modified and contains only three significant components.

The constraint $q_3$=0 must also be satisfied while the quaternion rate equation (Eq. 28 or 29) is being integrated. This condition can be maintained during the integration as long as the condition $dq_3/dt$=0 is also maintained. From Eqs. 28 and 29, this implies that one of the following conditions must hold:

$$0=dq_3/dt=-q_2\omega_1+q_1\omega_2+q_0\omega_3$$
(For Integration in the Body Frame) (Eq. 36)

$$0=dq_3/dt=q_2\omega_{E1}-q_1\omega_{E2}+q_0\omega_{E3}$$
(For Integration in the Earth Fame) (Eq. 37)

In order to satisfy one of these constraints, at least one parameter must be allowed to vary arbitrarily as required. In the body frame, the three angular rate components and the three modified quaternion components all contain necessary information. However, in the earth frame, it has been assumed that the yaw component of the angular rate is not important because the system is a tilt-based. Therefore, the true yaw component can be replaced with a virtual yaw component that satisfies the above constraint. In practice, this may be done by transforming the measured angular rate from the body frame into the earth frame. The resulting earth yaw can then be replaced with a virtual earth yaw which satisfies the following constraint equation:

$$\omega'_{E3}=(q_1\omega_{E2}-q_2\omega_{E1})/q_0$$
(Virtual Earth Yaw Satisfying $dq_3/dt$=0) (Eq. 38)

This earth yaw component can be substituted back into the original quaternion rate equation (Eq. 29) to eliminate its explicit dependence on yaw. In order to distinguish the modified three-element quaternion from other quaternions, the modified quaternion will now be denoted by "e" rather than "q". The components can then be written:

$$e_0=\cos(\theta/2) \text{ and } e=[e_1 \ e_2]^T=n\sin(\theta/2) \quad \text{(Eq. 39)}$$

where n=$[n_1 \ n_2]^T$ and $e_3=n_3$=0

After eliminating $\omega_{E3}$ and $e_3$, the modified quaternion rate equation becomes:

$$\begin{bmatrix} \dot{e}_0 \\ \dot{e} \end{bmatrix} = \frac{1}{2e_0} \begin{bmatrix} -e_0 e^T \\ I - ee^T \end{bmatrix} \begin{bmatrix} \omega_{E1} \\ \omega_{E2} \end{bmatrix} \text{ where } I = 2 \times 2 \text{ Identity} \quad \text{(Eq. 40)}$$

The rotation matrix $R_{EB}$ (Eq. 32) can also be simplified by eliminating $\omega_{E3}$ and $e_3$ as shown:

$$R_{EB} = [I - 2\text{ff}^T \ 2\text{fe}_0] \text{ where } f = [e_2 - e_1]^T \quad \text{(Eq. 41)}$$

Combining these results and noting that $\omega_E = R_{EB}\omega$, the modified quaternion rate referenced to the earth frame can be written as a function of the angular rate in the body frame as shown:

$$\begin{bmatrix} \dot{e}_0 \\ \dot{e} \end{bmatrix} = \frac{1}{2e_0} \begin{bmatrix} -e_0 e^T & 0 \\ Ie_0^2 - ff^T & 2e_0 f \end{bmatrix} \begin{bmatrix} \omega_1 \\ \omega_2 \\ \omega_3 \end{bmatrix} \quad \text{(Eq. 42)}$$

This can be stated more succinctly in matrix form as shown:

$$de/dt = E\omega/2 \quad \text{(Eq. 43)}$$

Using this result, the modified quaternion rates can be integrated to produce the modified quaternion. However, this equation assumes an ideal angular rate vector, $\omega$, and provides no compensation for the drift in the actual angular rate data from the gyros. In general, an offset must be subtracted from the raw gyro data to correct for the drift. The corrected angular rate of the form $\omega' = \omega - \omega_{drift}$ is then used in place of $\omega$ in the above equation. The situation is further complicated by the fact that the gyro drift is a function of time. Therefore, the drift correction term must be continuously updated. This requires the use of the second order estimator topology described earlier.

The purpose of the estimator is to compare the quaternion obtained by integration of the quaternion rate to the quaternion obtained from the tilt data. Assuming that any steady-state error is due to gyro drift only, the magnitude of this error can be used to adjust the gyro drift correction term. The estimator gains are chosen such that the steady-state error is, over time, driven to zero. Selection of estimator gain values is well within the abilities of those who are skilled in the art, and therefore need not be discussed further.

In order to properly adjust the correction term, the quaternion error must be converted back to an angular rate error. This is accomplished using the original quaternion rate equation which has been solved for angular rate in the earth frame as shown:

$$\omega_E = 2Q^T(dq/dt) \quad \text{(Eq. 31, repeated)}$$

Integrating this expression with respect to time produces the following result:

$$\Delta\theta_E = 2Q^T(\Delta q) = 2Q^T(q'-q) \quad \text{(Eq. 44)}$$

Therefore, the above equation can be used to convert the error between the estimated quaternion and the tilt quaternion ($\delta q = q'-q$) into a tilt angle error, $\Delta\theta_E$. It is recalled that in this case we are using the modified quaternion for which $q_3 = 0$ in both q and Q. However, the earth yaw component obtained in this way is not valid because the quaternion was generated using the virtual earth yaw. In order to produce a valid angular error, the original earth yaw must be substituted in place of the error component $\Delta\theta_{E3}$. The expression for the earth yaw can be derived from $\omega_E = R_{EB}\omega$ with $q_3 = 0$ and is given below:

$$\omega_{E3} = (-2q_2q_0)\omega_1 + (2q_1q_0)\omega_2 + (q_0^2 - q_1^2 - q_2^2)\omega_3 \quad \text{(Eq. 45)}$$

After substitution, the resulting angular error vector in the earth frame is given by $\Delta\theta_E' = [\Delta\theta_{E1} \Delta\theta_{E2} \omega_{E3}]^T$. Since the gyros are in the body frame, the angular error in the earth frame must be transformed into the body frame using $\Delta\theta = R_{BE}\Delta\theta_E'$. The resulting angular error can then be used by the estimator to produce the gyro drift correction term.

The method by which the tilt data is converted to a modified quaternion will now be discussed. It has been shown that the quaternion components can be produced by forming the dot and cross products of two unit vectors which are perpendicular to the axis of rotation and separated by an angle of $\theta/2$. Two such vectors can be constructed using the external reference point at the center of the earth (i.e. the direction of gravity as measured by the tilt sensor). Let the initial gravity vector be denoted as $G_i$ and let the final gravity vector be denoted by $G_f$. (The data corresponding to the initial gravity vector $G_i$ may be taken during an initialization procedure and stored for further use. The "final" gravity vector $G_f$ is to be updated as the estimator operates.)

Let these two vectors be normalized as shown:

$$g_i = G_i/|G_i| \text{ and } g_f = G_f/|G_f| \quad \text{(Eq. 46)}$$

Using these normalized gravity vectors, the desired unit vectors can be constructed as follows:

$$a = (g_i + g_f)/|g_i + g_f| \text{ and } b = g_i \quad \text{(Eq. 47)}$$

Finally, the quaternion components can be generated by computing the dot and cross products as shown below:

$$e_0 = a \cdot b \text{ and } e = a \times b \quad \text{(Eq. 48)}$$

By construction, the cross product of a and b produces a vector which is perpendicular to the gravity vector in each frame. Consequently, this vector must also be horizontal. This implies that the z-component of the quaternion is identically zero as desired. Therefore, only the first three elements of the quaternion are non-trivial and satisfy the form of the modified quaternion.

The overall estimation process described above is illustrated in the block diagram of FIG. 4.

Figure 4:
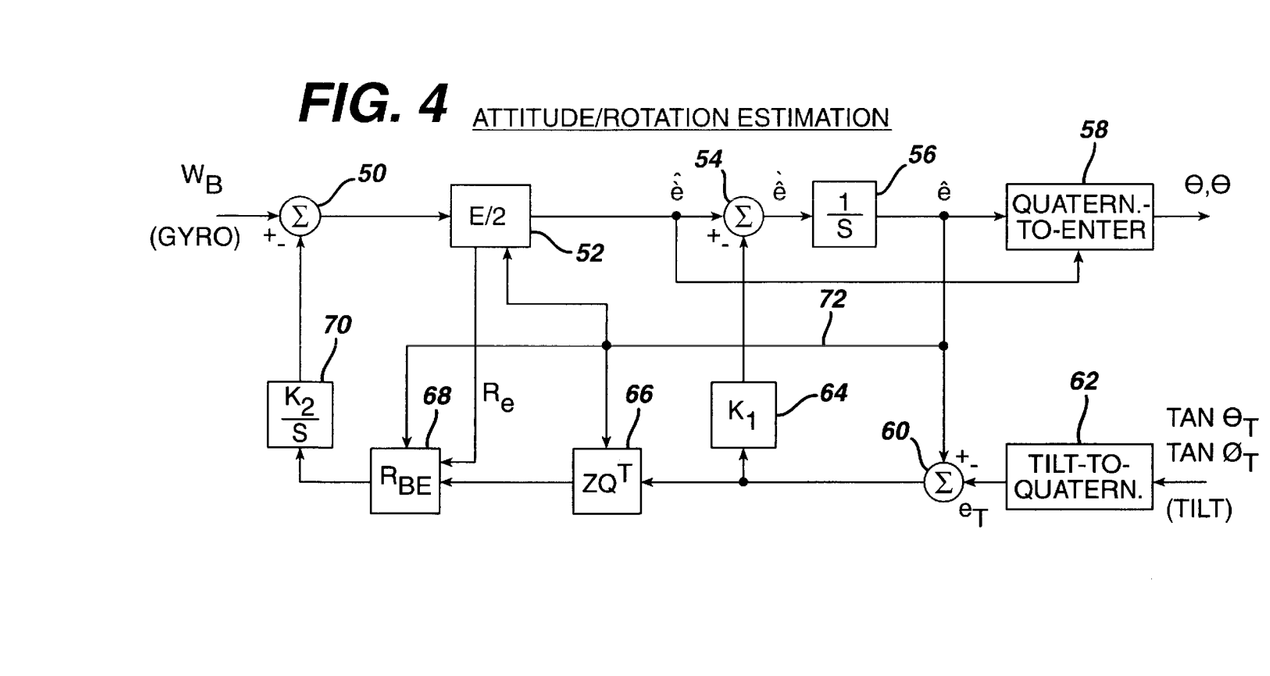
FIG. 4 is a block diagram representation of an attitude and rotation estimation portion, provided in accordance with the invention, of the control system of FIG. 3.

The estimator topology is split into two loops: the $k_1$ loop and the $k_2$ loop. The $k_1$ loop provides low bandwidth filtering of the data from the tilt sensor, and determines the amount of error that is used to adjust the estimated quaternion rate. The $k_2$ loop provides drift correction for the gyro data. Since the gyros are in the body frame, the $k_2$ loop must lie on the body side of the coordinate transformation. The $k_2$ gain determines the amount of error that is used to correct the drift in the gyro data. The weighted error is then integrated so that the loop will, over time, achieve zero steady-state error. In other words, when the quaternion error reaches zero, the output of the $k_2$ integrator stops changing and the drift correction term remains constant.

In FIG. 4, a summation block 50 in the $k_2$ loop applies a weighted error signal (which may also be considered a drift correction signal) to the angular rate information outputted from the gyros 16, to produce corrected angular rate information. The corrected rate information is converted to the earth frame of reference and transformed into a modified quaternion at block 52. As indicated by the label E/2 in block 52, the calculations applied in that block are in accordance with equations 43 and 42, which were discussed above. The resulting estimated rate information, which is in the above-described modified quaternion form is provided as an input to a summation block 54. At block 54, a correction provided by the $k_1$ loop is applied to the estimated quaternion rate information to produce data indicative of the change in the estimated position. This data (which may be referred to as an estimated position difference signal) is, in turn, integrated at block 56 to provide the modified quaternion estimated position data. At block 58, the modified-quaternion estimated position data outputted from block 56, and also the estimated modified-quaternion rate information outputted from block 52, are converted to Euler angles to be outputted to the control signal generation block 44 (FIG. 3). This conversion is easily accomplished using the following equations. (Although these equations use trigonometric functions, the computational complexity is minimal and can easily be performed using lookup tables.)

$$\theta = \operatorname{asin}(2e_2 e_0) \text{ and } \phi = \operatorname{asin}(2e_1 e_0/\cos\theta) \quad \text{(Eq. 49)}$$

These equations can also be simplified using small-angle approximations in the event that the range of motion of the tilt-based system is limited.

If the control signal generator 44 is of the type which outputs quaternion signals rather than Euler signals, than block 58 may be omitted and the estimated quaternion position and rate information (in the modified form provided in accordance with the invention) may be provided directly to the control signal generator.

In any case, the estimated position information in modified quaternion form is provided as an input to a summation block 60, at which it is compared to the current tilt information outputted from the tilt sensors 14, as converted to the modified quaternion form at block 62. (The signal produced at block 62 may be referred to as a modified quaternion reference position signal.) The conversion carried out at block 62 is in accordance with the procedure described above in connection with Eqs. 46–48. The resulting error signal outputted from summation block 60 is weighted by the gain factor $k_1$ at block 64, and then is applied as the above-mentioned correction signal at block 54. The output from block 60 (which may be considered an error position signal) is also provided as an input to block 66. In accordance with Eq. 44, block 66 converts the error between the estimated quaternion and the tilt quaternion into a tilt angle error. The invalid yaw component of the resulting signal output from block 66 is replaced with the earth-frame yaw component which is available from the processing of block 52, and the resulting angular error vector is converted to the body frame of reference at block 68. The output of block 68 is then integrated and weighted by the $k_2$ gain at block 70, and the resulting signal is applied at summation block 50 as the above-mentioned drift correction signal.

It should be noted that the coefficients required for the processes in blocks 52, 66 and 68 are taken from the modified-quaternion position information outputted from the integration block 56, as is indicated at 72 in FIG. 4.

As will be appreciated by those who are skilled in the art, the processes illustrated in block diagram form in FIG. 4 may advantageously be performed by one or more suitably programmed computing devices (e.g. one or more microprocessors) which constitute part of the control system 12.

In the attitude and rotation estimator provided in accordance with the invention, high bandwidth information provided by rotation sensors and low bandwidth information from tilt sensors are combined in a novel modified quaternion notation having three elements instead of the conventional four elements. The resulting estimated quaternion is valid over the designed bandwidth and does not drift over time. The computations to be performed can be handled efficiently using simple arithmetic such as multiplication, addition and square root. The modified quaternion estimator is applicable to a broad range of systems in which tilting is to be tracked and/or controlled.

The above description of the invention is intended to be illustrative and not limiting. Various changes or modifications in the embodiments described may occur to those skilled in the art and these can be made without departing from the spirit or scope of the invention.

What is claimed is:

1. A method of estimating the attitude of a tiltable body, said body including tilt sensing means and angular rate sensing means, the method comprising the steps of:

outputting angular rate information from said angular rate sensing means;

transforming and integrating said outputted angular rate information to produce first quaternion position information such that said first quaternion position information is constrained to represent a rotation about a horizontal axis in an earth frame of reference;

outputting tilt information from said tilt sensing means;

processing said outputted tilt information to generate second quaternion position information such that said second quaternion position information is constrained to represent a rotation about a horizontal axis in said earth frame of reference;

comparing said first quaternion position information to said second quaternion position information to generate error information; and using said error information to compensate for drift in said angular rate sensing means.

2. A method of estimating the attitude of a tiltable body, said body including tilt sensing means and angular rate sensing means, the method comprising the steps of:

outputting angular rate information from said angular rate sensing means;

generating modified quaternion rate information from said outputted angular rate information, said modified quaternion rate information being in the form of a scalar quantity and a two-component vector;

integrating said modified quaternion rate information to generate first modified quaternion attitude information, said step of generating said modified quaternion rate information being constrained so that said first modified quaternion attitude information is of the form $e = e_0 + e_1 i + e_2 j$, where i, j are imaginary unit vectors which satisfy the following relations with each other and with a third imaginary unit vector k:

$$i^2 = j^2 = k^2 = ijk = -1,\ ij = -ji = k,\ jk = -kj = i,\ ki = -ik = j;$$

outputting tilt information from said tilt sensing means;

generating second modified quaternion position information from said outputted tilt information, said second modified quaternion position information being of said form $e = e_0 + e_1 i + e_2 j$;

comparing said first modified quaternion position information to said second modified quaternion position information to generate modified quaternion position error information;

transforming said modified quaternion position error information into an angular rate error signal; and using said angular rate error signal to compensate for an error in said outputted angular rate information.

3. A method according to claim 2, further comprising the step of low pass filtering said second modified quaternion position information.

4. A method according to claim 2, wherein:

said angular rate information is provided in a first frame of reference and said tilt information is generated in a second frame of reference different from said first frame of reference;

said step of generating said modified quaternion rate information includes converting said outputted angular rate information from said first frame of reference to said second frame of reference; and further comprising the step of converting said angular rate error signal from said second frame of reference to said first frame of reference before said using step.

5. A method according to claim 2, wherein said second modified quaternion position information is generated on the basis of first tilt information outputted from said tilt sensing means and stored on a first occasion and second tilt information outputted from said tilt sensing means on a second occasion different from said first occasion.

6. A method of estimating the attitude of a tiltable body, comprising the steps of:

generating angular rate information in a body frame;

applying a drift correction signal to said angular rate information to produce corrected angular rate information;

processing said corrected angular rate information using modified quaternion estimated position information to produce modified quaternion estimated rate information referenced to an earth frame, said modified quaternion estimated rate information consisting of a scalar component and two vector components;

adjusting said modified quaternion estimated rate information on the basis of a weighted position error signal to produce an estimated position difference signal;

integrating said estimated position difference signal to produce said modified quaternion estimated position information, said modified quaternion estimated position information consisting of a scalar component and two vector components;

generating tilt information in said earth frame;

using said tilt information to generate modified quaternion reference position information, said modified quaternion reference position information consisting of a scalar component and two vector components;

subtracting said modified quaternion reference position information said modified quaternion estimated position information to produce an error position signal;

weighting said error position signal to produce said weighted position error signal;

converting said error position signal to a tilt angle error signal using said modified quaternion estimated position information;

forming an angular error vector from pitch and roll components of said tilt angle signal and from a yaw component of an angular rate signal generated by converting said corrected angular rate information to said earth frame using said modified quaternion estimated position information;

converting said angular error vector from said earth frame to said body frame using said modified quaternion estimated position information; and applying weighted integration to said converted angular error vector to generate said drift correction signal.

7. A method according to claim 6, further comprising the steps of:

converting said modified quaternion estimated rate information and said modified quaternion estimated position information to generate Euler angle output information; and outputting said Euler angle output information to control signal generating means.

8. Apparatus for estimating the attitude of a tiltable body, comprising:

tilt sensing means mounted on said body for outputting tilt information;

angular rate sensing means mounted on said body for outputting angular rate information;

means for generating modified quaternion rate information from said angular rate information outputted from said angular rate sensing means, said modified quaternion rate information being in the form of a scalar quantity and a two-component vector;

means for integrating said modified quaternion rate information to generate first modified quaternion attitude information, said first modified quaternion attitude information being of the form $e=e_0+e_i i+e_2 j$; where i, j are imaginary unit vectors which satisfy the following relations with each other and with a third imaginary unit vector k:

$$i^2=j^2=k^2=ijk=-1,\ ij=-ji=k,\ jk=-kj=i,\ ki=-ik=j;$$

means for generating second modified quaternion position information from said tilt information outputted from said tilt sensing means, said second modified quaternion position information being of said form $e=e_0+e_1 i+e_2 j$;

means for comparing said first modified quaternion position information to said second modified quaternion position information to generate modified quaternion position error information;

means for transforming said modified quaternion position error information into an angular rate error signal; and means for compensating for an error in said angular rate information outputted from said angular rate sensing means on the basis of said angular rate error signal.

9. Apparatus according to claim 8, wherein said tilt sensing means includes at least one fluidic tilt sensor.

10. Apparatus according to claim 9, wherein said angular rate sensing means includes at least one gyro.

11. Apparatus according to claim 8, further comprising means for converting said modified quaternion rate information into Euler angle rate information and for converting said first modified quaternion attitude information into Euler angle position information.

* * * * *